United States Patent [19]

Schneider

[11] 4,281,409

[45] Jul. 28, 1981

[54] METHOD AND APPARATUS FOR MULTIPLEX BINARY DATA COMMUNICATION

[76] Inventor: Kenneth S. Schneider, 134 Birchwood Park Dr., Jericho, N.Y. 11753

[21] Appl. No.: 50,927

[22] Filed: Jun. 25, 1979

[51] Int. Cl.³ .................. H04J 13/00; H04J 11/00
[52] U.S. Cl. ................................. 370/18; 370/19
[58] Field of Search .................. 370/18, 19, 20, 21, 370/22

[56] References Cited

U.S. PATENT DOCUMENTS

| | | | |
|---|---|---|---|
| 3,510,595 | 5/1970 | Gutleber | 370/18 |
| 3,715,508 | 2/1973 | Blasbalg | 370/18 |
| 3,720,789 | 3/1973 | Clark | 370/18 |
| 3,789,148 | 1/1974 | Ishii | 370/18 |

FOREIGN PATENT DOCUMENTS 2222923  10/1974  France ............................ 370/18

OTHER PUBLICATIONS

*Principles of Communication Engineering*, by Wozencraft et al., 1965, pp. 405, 409, 410, 417, 426.

Primary Examiner—Douglas W. Olms
Attorney, Agent, or Firm—Hane, Roberts, Spiecens & Cohen

[57] ABSTRACT

In electromagnetic communication different data streams share a common communication medium, by being multiplexed. Each individual data stream employs its own unique modulation waveform set. A receiver for a given data stream comprises correlators for the waveforms in the corresponding modulation waveform set. If the waveforms in all the different modulation waveform sets are not orthogonal, then the output of correlators at a given receiver will not only contain the desired information components of the data stream to which they are matched but also components from the other data streams. This is termed cross-talk. Processors are provided which are responsive to the outputs of all waveform correlators. They provide a means for detecting the original data stream information in the presence of cross-talk. When there is no noise in the communication transmission the processors cancel the cross-talk.

26 Claims, 14 Drawing Figures

TRANSMITTER CONTROL UNIT — TC

MODULATOR — MDK

FIG. 10

RECEIVER CONTROL UNIT
RC

METHOD AND APPARATUS FOR MULTIPLEX BINARY DATA COMMUNICATION

BACKGROUND OF THE INVENTION

This invention relates to multiplexed data communication systems and more particularly to minimizing the effects of cross-talk in such systems.

Electromagnetic transmission media such as wire, radio, microwave, etc. have long been used for implementing communication channels. The amount of information that can be passed through such media is a function of its bandwidth. With the recent use of communications for remote computing, control, data collection, etc. the available bandwidth of electromagnetic transmission media is the subject of increasing contention from would-be communicators. Such contention has led to interest in spectrally efficient modulation and multiplexing techniques. These are techniques which allow the reliable communication of the greatest number of bits per Hertz. Two examples of techniques which have considerable attention are now discussed.

Many investigations have been carried out dealing with the close packing of Frequency Division Multiple Access (FDMA) communicators. This work, has been concerned with development of modulation and windowing techniques which minimize cross-talk among FDMA communicators. Its philosophy lies in pre-transmission processing. Waveform distortion is purposefully introduced to reduce spectral side lobes. Unfortunately, from the view of actual implementation, this technique is not attractive. If the channel itself introduces even limited distortion of communication signals, the demodulation process is seriously affected. The FDMA procedure is still used and wasteful guardbands are still present. Finally, minimization of cross-talk requires careful synchronization of FDMA carriers which is often difficult to effect.

Along another line, there has been a significant effort invested in achieving greater spectral efficiency through statistical multiplexing techniques such as packets communications. However, this approach to improving efficiency is limited only to bursty type communications.

BRIEF SUMMARY OF THE INVENTION

It is an object of the invention to provide an improved approach to achieving spectral efficiency.

Fundamentally, cross-talk between communications is allowed during transmission. Its effect in demodulation is then ameliorated through improved receiver processing.

In general the invention contemplates a plurality of communicators at a transmitter wherein each of the communicators emits bits of information to respective modulators each operating with a linearly independent modulation signal whereby bit-modulated signals are transmitted via a common transmission medium to a plurality of users at a receiver. When the bit-modulated signals are received they are correlated with signals related to the independent modulation signals to form intermediate signals which are further processed by steps including signal polarity sensing techniques to extract the bit information for each user.

There are related techniques shown in U.S. Pat. No. 3,720,789 and U.S. Pat. No. 3,735,266. However, the teachings therein still leave much to be desired in any practical digital transmission system.

BRIEF DESCRIPTION OF THE DRAWINGS

Other objects, the features and advantages of the invention will be apparent from the following detailed description when read with the accompanying drawing which shows by way of example and not limitation apparatus for realizing the invention. In the drawing.

DESCRIPTION OF THE PREFERRED EMBODIMENTS

Figure 1:
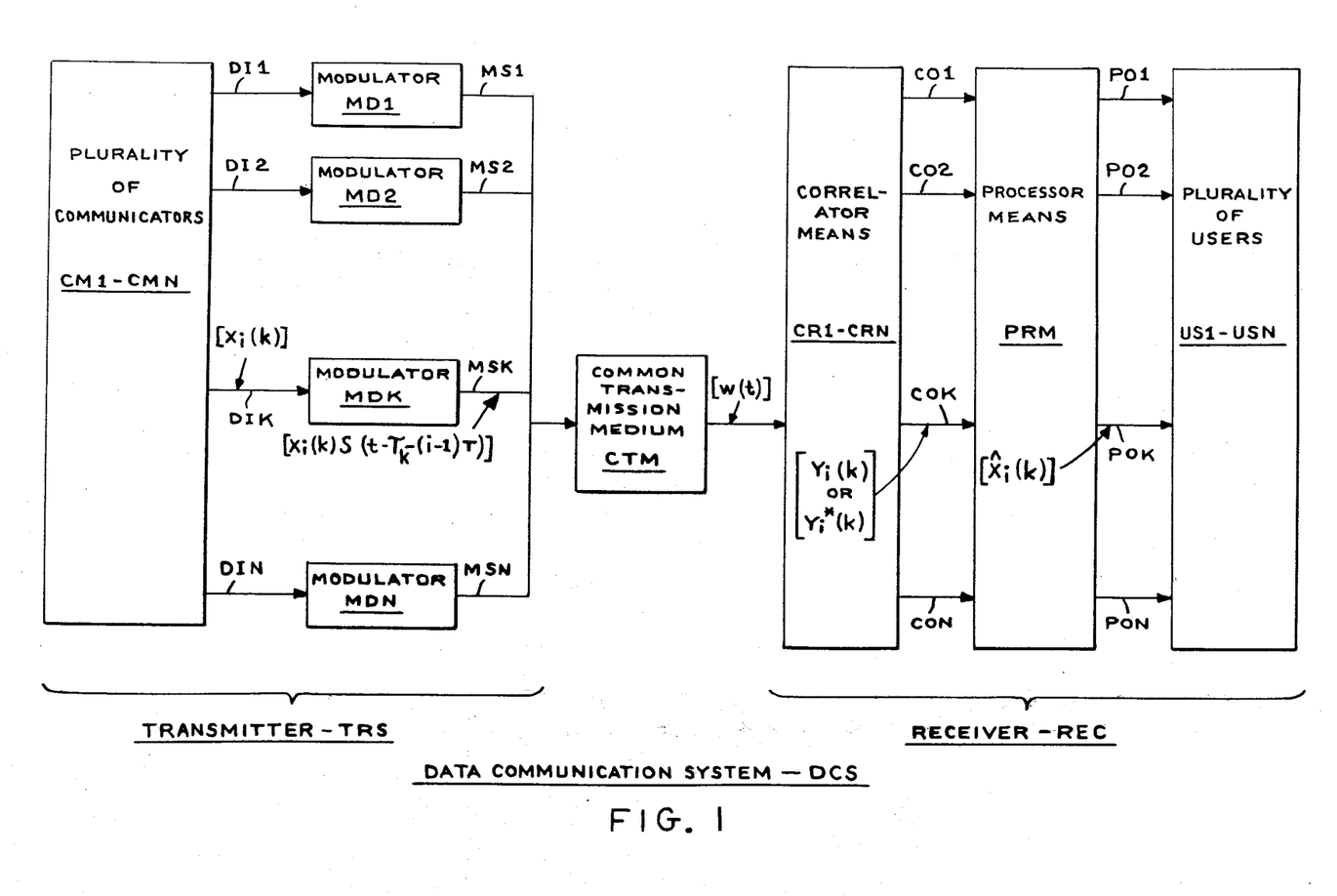
FIG. 1 is a block diagram of a generalized data communication system utilizing the invention.

In FIG. 1 there is shown a data communication system DCS in the form of a transmitter TRS feeding binary data as modulated signals via a common transmission medium CTM to a receiver REC. The transmitter TRS includes a plurality of communicators CM1-CMN each feeding a stream of binary signals on respective lines DI1 to DIN in parallel to their associated modulators MD1 to MDN. The outputs of modulators are fed on commonly connected to lines MS1 to MSN to common transmission medium CTM. The medium CTM can be wire, coaxial cable, fibre optics, microwave-guide or the atmosphere. The receiver REC includes: the correlator means CR1 to CRN, a plurality of correlators each demodulating one of the plurality of simultaneously received modulated signals; a processing means PRM connected to the lines CO1 to CON from the respective correlators for reliably predicting the binary value of the demodulated signals; and a plurality of users US1 to USN each connected to a respective output, via a line PO1 to PON, from the processor means PRM.

In general, a typical communicator CMR emits, simultaneously with the other communicators, a stream of binary signals in the form $X_i(k)$ to its modulator MDK which in response thereto emits a signal in the form $$X_i(k) \cdot S_k(t - \tau_k - (i-1)T).$$

The signals from all modulators are fed, via common transmission medium CTM, as a composite signal w(t) to the correlator means CRK (as well as all other correlator means) where it is demodulated to a signal of the form $Y_i(k)$ or $Y_i^*(k)$. This signal is fed via line COK to processor means PRM which further processes this signal to produce a binary valued signal in the form $\hat{X}_i(k)$ fed via line POK to user USK. (note at the same time the messages for other users are being similarly processed.

Figure 2:
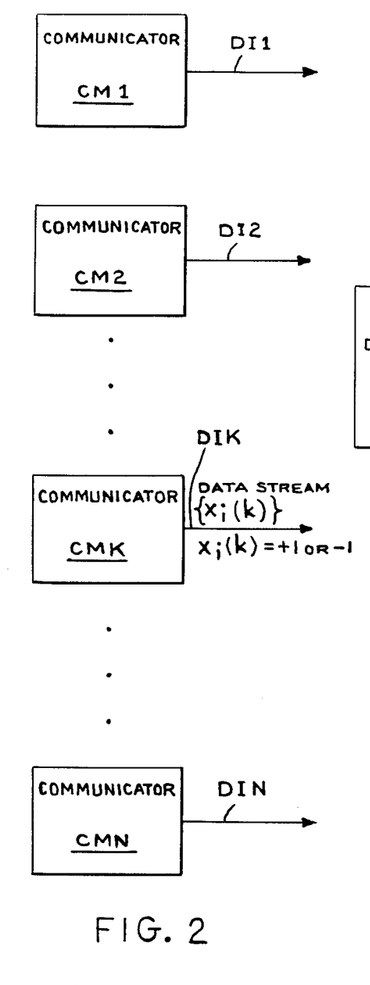
FIG. 2 is a block diagram of one set of communicators of the system of FIG. 1.
Figure 3:
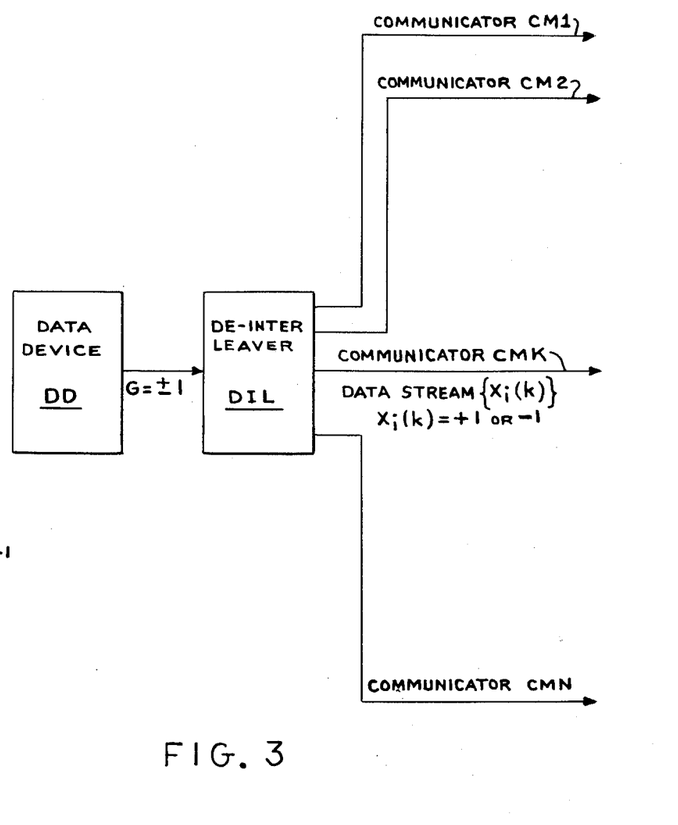
FIG. 3 is a block diagram of another set of communicators of the system of FIG. 1.

In this system the different communicators CM1 to CMN each want to communicate a data stream of binary digits +1 or −1. The data streams are each being generated at the same band rate (binary digits per second). This situation may result from each communicator being a device which puts out a binary data stream as shown in FIG. 2. It may also result as shown in FIG. 3 where a data device DD which puts out binary data stream which is broken into separate data streams (de-interleaved) by de-interleaver DIL for transmission purposes. In FIGS. 1 to 3 signal $X_i(k)$ represents the $i^{th}$ data bit (i=1, 2, ...) in the $k^{th}$ data stream, the stream from a typical communicator CMK. The N data streams one from each communicator each generate data bits at the rate of one every T seconds. In FIG. 3 the Data device DD generates data bits at the rate of one every T/N seconds.

In order to effect the transmission of the data streams, shown in FIGS. 2 and 3, over the common transmission medium CTM, each communicator CMK is assigned a unique modulation waveform signal. The modulation waveform signal assigned to communicator CMK is in the form $S_k(t)$. It is T seconds long. Otherwise the only restriction on the entire set of modulation waveform signals $\{S_k(t), k=1, \ldots N\}$ is that they be linearly independent. That is, no waveform signal can be expressed as a weighted sum of the other waveform signals. Transmission of the different data streams using the modulation waveform signal is assumed to be carried out as shown in FIG. 1. The first data bit in the data stream corresponding to communicator CMK is put out at time $\tau_k$ where $0 \leq \tau_1 \leq \tau_2 \ldots \leq \tau_N \leq T$. The $i^{th}$ data bit, signal $X_i(k)$ is put out in this stream at time $\tau_k + (i-1)T$. Signal $X_i(k)$ is supplied to the modulator MDK which in turn feeds the signal obtained from multiplying this data bit by the modulation waveform, i.e., signal, $$X_i(k) \cdot S_k(t - \tau_k - (i-1)T),$$

into the common transmission medium CTM.

The communicators CM1 to CMN shown in FIG. 1 each have the intention of delivering their respective data streams to a data sink or user. Let a user USK of the plurality of users represent the intended data sink of communicator CMK.

Figure 4:
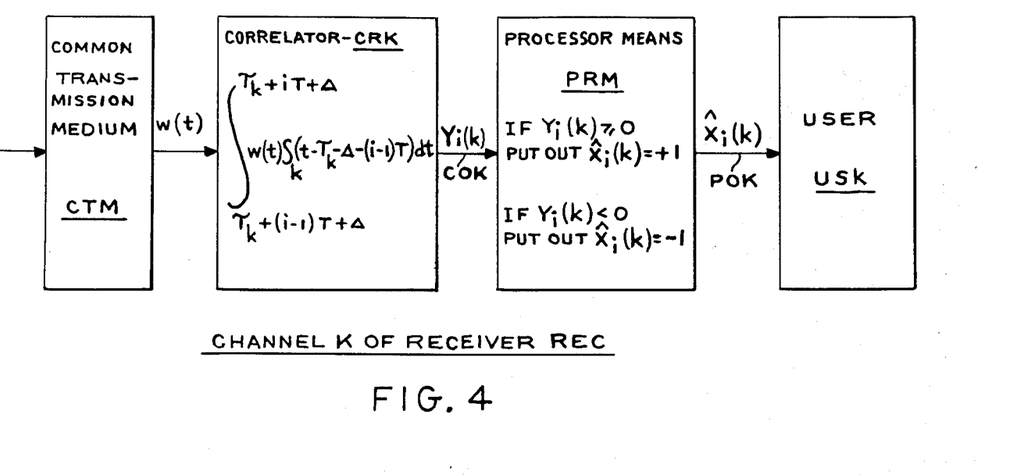
FIG. 4 is a block diagram of one embodiment to the receiver of FIG. 1.

In one embodiment of the invention the receiver REC comprises N channels each associated with a communicator-user pair. In FIG. 4 the channel of the communicator CMK-user USK pair is shown. In this embodiment of the receiver the entire output of the common transmission medium CTM is obtained or "observed" as signal waveform w(t) and is due to the transmissions from all communicators CM1 to CMN sharing the transmission medium. It may contain noise. Throughout the specification such noise is assumed additive. The modulation waveform components of it may have been distorted by the transmission medium. The receiver of user USK synchronizes itself to those components of w(t) which correspond to communicator CMK. That is, it learns the times $\tau_k + \Delta$, $\tau_k + T + \Delta$, ... at which the components of w(t) due to communicator CMK arrive at the receiver REC. Synchronization methods for doing this are hereinafter described. $\Delta$ is the propagation delay between communicator CMK and user USK as measured through the common transmission medium CTM. The receiver of user USK produces a stream or sequence of signals $\{Y_i(k)\}$. It produces this stream in the correlator CRK. The signal $Y_i(k)$ is computed by taking the signal w(t) and multiplying it by the signal $S_k(t - \tau_k - \Delta - (i-1)T)$. The resulting product signal is a function of time which is integrated over the time interval $$[\tau_k + (i-1)T + \Delta, \tau_k + iT + \Delta].$$

The result of this integration is the stream signal $Y_i(k)$. Each successive $Y_i(k)$ signal is fed to the processor means PRM. The processor means is a sign detector which operates as follows. If signal $\hat{Y}_i(k) \geq 0$ the sign detector supplies a signal $\hat{X}_i(k) = +1$ to user USK. If signal $Y_i(k) < 0$ the processor means supplies signal $\hat{X}_i(k) = -1$ to user USK. $\hat{X}_i(k)$ is a demodulator bit decision concerning the identity of communicator CHK data stream bit, in the form of signal $X_i(k)$.

The receiver processing illustrated in FIG. 4 is optimum in the sense of providing minimum probability of error in the situation in which all of the waveforms $\{S_k(t)\}$ are orthogonal, the noise perturbing the common transmission medium is white and Gaussian, and the modulation waveform signals are undistorted in transmission. In this situation the samples, signals $Y_i(k)$, are each composed of the sum of two components signal $X_i(k)$—the $i^{th}$ transmitted data bit from communicator CMK and $n_k$ a noise sample. There are no components due to the modulation waveforms carrying the data bits from communicators CMJ, $j \neq k$, no cross-talk between the simultaneous data streams in the transmission medium.

The term "orthogonal" is used here in the way it is employed in mathematical analysis. That is two waveforms, a(t) and b(t) defined for all "t" are orthogonal if $$\int_{-\infty}^{\infty} a(t) \cdot b(t) \, dt = 0.$$

While the receiver of FIG. 4 is satisfactory for certain operating systems, there will now be described the improved receiver.

The improved receiver permits better communication performance in the situation in which the modulation waveform signals, $\{S_k(t), k=1, \ldots N\}$ are not all orthogonal. However, the modulation waveform signals are still assumed to be linearly independent. This improved receiver has the basic structure shown in FIG. 5 when it is implemented as a signal processor for demodulation of the signals for user USK.

Figure 5:
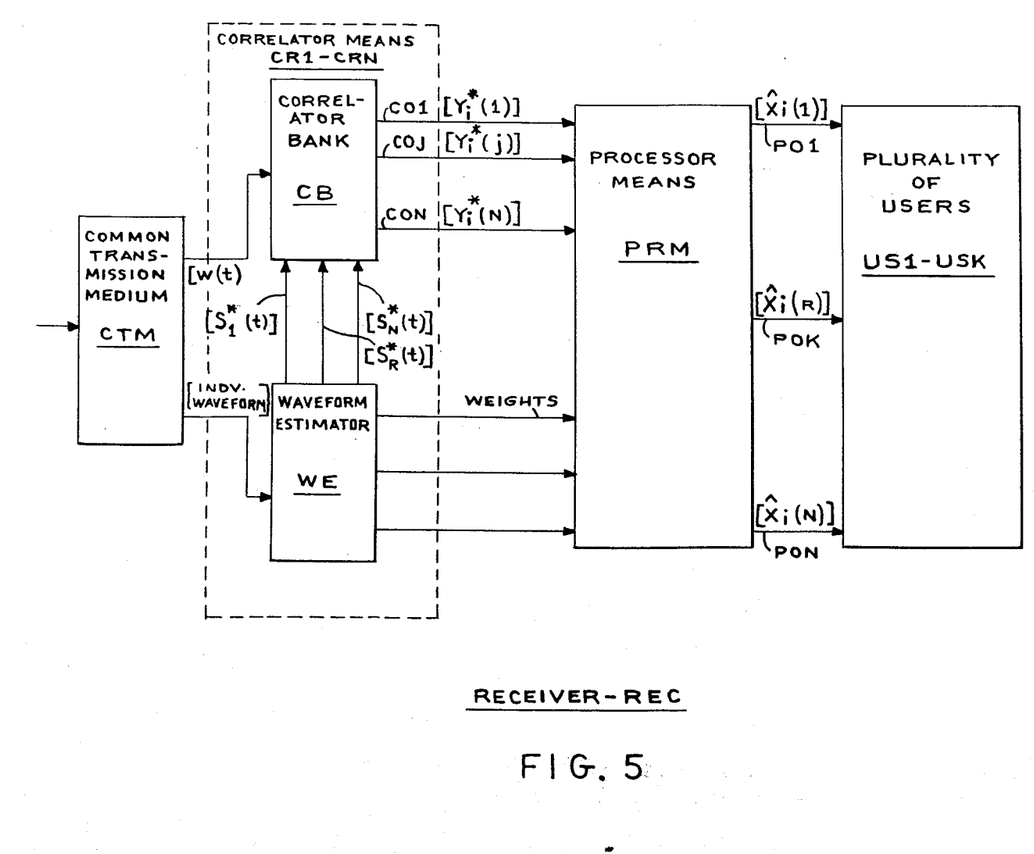
FIG. 5 is a block diagram of an improved receiver for the system of FIG. 1.

The major changes are that the correlator means CR1-CRN comprises a bank of correlators CR1 to CRN which are similar to the correlators of FIG. 4 and a waveform estimator WE; and that the processor means PRM in addition to including sign detectors includes means for algebraically processing signals.

Operation of the improved receiver will now be described. Initially, the waveform estimator WE is the only part of the improved receiver which is initially in operation. It is assumed that before the N communicators CM1 to CMN transmit their data stream there is a "learning period." During this period each communicator is assigned a segment of time during which he has the sole use of the common transmission medium CTM. During its assigned segment a given communicator only transmits copies of its modulation waveform signal. That is, communicator CMK will transmit copies of waveform signal $S_k(t)$. At the receiver side, the waveform estimator WE is controlled by logical circuitry to know when this learning period begins and ends as hereinafter described. It also is controlled to know by logical circuitry which portions of it are segments devoted to which communicators as hereinafter described. During the segment devoted to communicator CMK it observes the successive waveforms received due to each transmitted waveform $S_k(t)$. It averages the received copies to produce a waveform signal $S_k^*(t)$. This averaging may be accomplished by storing the received waveforms in some form of memory. The stored copies may then be summed. The sum is then divided by the number of waveforms stored. At the end of the learning period the waveform estimator WE passes the set of averaged received waveform signals $\{S_k^*(t), k=1, \ldots N\}$ to the respective correlators in correlator bank CB.

At the end of the learning period the correlator bank CB block comes into operation and remains in operation thereafter. It receives as its input the common transmission medium output signal, w(t). With this input once every T seconds it produces as its output a set of N samples, one per correlator. The details of the operation of this block can be described with the aid of FIG. 6. As stated above the correlator bank CB is composed of N separate correlators. Each correlator corresponds to a different modulation waveform signal. Each correlator in the bank obtains the "average" received version of this waveform signal from the waveform estimator WE. That is, correlator CRJ in the bank receives signal $S_j^*(t)$ from the waveform estimator WE. The correlator bank CB produces the $i^{th}$ set of its outputs $\{Y_i^*(1), \ldots Y_i^*(j), \ldots Y_i^*(N)\}$ by the following procedure. Note th $i^{th}$ set is in effect the $i^{th}$ bit in each transmitted data stream. Signal $Y_i^*(j)$ is obtained by multiplying the common transmission medium output, i.e., signal w(t), by signal $S_j^*(t-\tau_j-\Delta-(i-1)T)$. The product is then integrated over the time interval $\{\tau_j+(i-1)T+\Delta, \tau_j+iT+\Delta\}$. The result of this definite integration signal is $Y_i^*(j)$. The correct times, $\tau_j+(i-1)T+\Delta$ are obtained by synchronization techniques as hereinafter described.

The processor means PRM operates on the sequence of sample sets $\{Y_i^*(1), \ldots Y_i^*(N)), i=1, 2, \ldots\}$ presented to it. It operates on this sequence to produce demodulator decisions about the binary data stream intended for the users and specifically for user USK. The sequence of demodulator decisions $$\{\hat{X}_i(k), i=1, 2, \ldots\}$$

are estimates of the transmitted data bits from communicator CMR. The processor means operates differently depending upon whether or not the N communicators are synchronized. Both embodiments of the processor means will now be described.

Consider first the situation in which all of the N communicators are synchronized. In this case, lines $$\tau_i = \tau_2 = \ldots \tau_k = 0.$$

Let $R_{jm}$ be the correlation at "zero offset in time" of the two waveforms $S_j^*(t)$ and $S_m^*(t)$. Formally, there is defined $$R_{jm} = \int_{-\infty}^{\infty} S_j^*(t) S_m^*(t) \, dt.$$

Let R be the matrix of these correlations. That is, $R=[R_{jm}]$. Let V be the inverse of the matrix R. That is, $V=R^{-1}$. The components of V are represented as $V=[V_{jm}]$. It is assumed that this inverse exists. If there is no distortion in the common transmission medium, i.e. if signal $S(t)=S^*(t)$, then it automatically exists by the assumption that the members of $\{S_k(t), k=1, \ldots N\}$ are linearly independent. In usable transmission media this is enough to assure that the members of $\{S_k^*(t), k=1, \ldots N\}$ are also linearly independent and V exists. When the N communicators are all synchronized the processor means PRM operates by determining the demodulator decision, the estimate $\hat{X}_i(k)$, from the $i^{th}$ bit input set $(Y_i^*(1), \ldots Y_i^*(j) \ldots Y_i^*(N))$ by forming the value $$+1 \cdot \text{sign}\left\{\sum_{j=1}^{N} V_{jk} Y_i^*(j)\right\}$$

and setting $\hat{X}_i(k)$ equal to it. That is, $$\hat{X}_i(k) = +1 \cdot \text{sign}\left\{\sum_{j=1}^{N} V_{jk} Y_i^*(j)\right\}$$

The function "sign" merely takes the sign of its arguement. Arguements which are zero are considered positive. The processor means PRM operating in this embodiment can form the estimate, $\hat{X}_i(k)$, by a variety of means. It may first quantize the weights $V_{jk}$'s and $Y_i^*(j)$'s is to a high degree and then use digital logic circuitry to form the respective products, sum and take the sign as hereinafter described. It may use analog devices such as operational amplifiers to form the respective products, sum and take the sign. Since the weights "$V_{jk}$" are functions of the set of "average" waveforms $\{S_j^*(t)\}$ they can be formed directly in the waveform estimator WE immediately after the "average" waveforms $\{S_j^*(t)\}$ have been obtained as will hereinafter be described. These weights can then be passed to the processor means PRM to be used in forming signals $\hat{X}_i(k)$.

Note that when $\{S_k^*(t), k=1, \ldots N\}$ are all orthogonal this reduces to the sign detector of the receiver of FIG. 4. When $\{S_k^*(t), k=1, \ldots N\}$ are not orthogonal but the communication process is noise free, all effects of cross-talk are completely eliminated with the invention described herein, that is value $\hat{X}_i(k)=$value $X_i(k)$ for every i and k. Finally, as long as all noise processes perturbing the communications are zero mean, it can be shown that signals $\hat{X}_i(t)$ as formed herein is the value which minimizes the probability of error given that any processing in demodulation must operate with the correlator outputs $(Y_i^*(1), \ldots Y_i^*(N))$ as inputs and produce an estimate of the transmitted data bit of interest which is constrained to be +1 or −1.

Now consider the situation in which the N communicators are not necessarily synchronized. Let $R_{jm}(\theta)$ be the cross correlation of waveforms $S_j^*(t)$ and $S_m^*(t)$ at offset $\theta$, in time. Formally, there is defined $$R_{jm}(\theta) = \int_{-\infty}^{\infty} S_j^*(t+\theta) S_m^*(t)\, dt.$$

Figure 6:
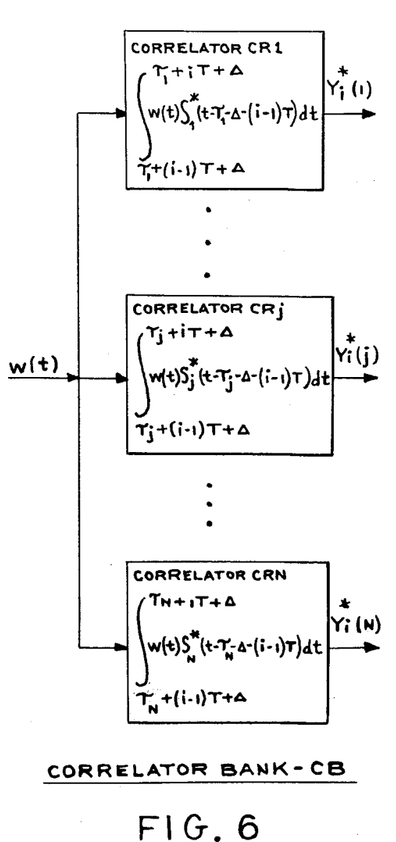
FIG. 6 is a block diagram of the correlators of the receiver of FIG. 5.

There is also defined the following matrices $U=[U_{jm}]$, $A=[A_{jm}]$ and $B=[B_{jm}]$. These are defined by the relations below:

Matrix U $U_{jj}=1$, for $j=1,\ldots N$
$U_{jm}=R_{jm}(\tau_m-\tau_j)$ for $j \neq m$ Matrix A $A_{jm}=0$, for $j>m$
$A_{jm}=R_{jm}(\tau_m-\tau_j-T)$, for $j \leq m$ Matrix B $B_{jm}=0$, for $j \leq m$
$B_{jm}=R_{jm}(\tau_m-\tau_j+T)$, for $j>m$ Using standard matrix algebra it can be shown that the $i_{th}$ correlator band CB output set is related to the communicator data stream output bits by the following equation $$Y^*_i = UX_i + AX_{i+1} + BX_{i-1} + n_i$$

Note the vectors defined formally as $$Y_i^* = \begin{bmatrix} Y_i^*(1) \\ \vdots \\ Y_i^*(j) \\ \vdots \\ Y_i^*(N) \end{bmatrix} \quad X_i = \begin{bmatrix} X_i(1) \\ \vdots \\ X_i(j) \\ \vdots \\ X_i(N) \end{bmatrix}$$

with $X_{i+1}$ and $X_{i-1}$ consistently defined and $n_i$ is the vector of noise samples perturbing the transmission process $$n_i = \begin{bmatrix} n_i(1) \\ \vdots \\ n_i(j) \\ \vdots \\ n_i(N) \end{bmatrix}$$

$n_i(j)$ is the noise component of the $i^{th}$ output of correlator #j. The previous equation specifying the relationship between $Y^*_i$ and $\{X_i, i=1,2,\ldots\}$ indicates that $Y^*_i$ observed at the output of the correlator bank could just as well have been obtained by having the $X_i$'s from the communicator data streams drive a linear finite state machine.

Such a finite state machine is itself equivalent to a rate 1 Convolutional Encoder. Thus, estimating the data bits in the N communicator streams is exactly equivalent to estimating the sequence of states of a Convolutional Encoder shift register from the sequence of correlator bank CB outputs $\{Y^*_i\}$. A state of the Convolutional Encoder is the identity of the shift register contents. The processor means PRM uses these facts concerning the equivalence with Convolutional Encoder operation when it operates in the situation when communicators are not necessarily synchronized. It stores a copy of the convolutional encoder-finite state machine. It obtains the tap weights from the waveform estimator WE. Once the average received signal waveforms $\{S_k^*(t)\}$ are obtained during the learning period the tap weights can be readily computed since they are functions of $\{S_k^*(t)\}$. The processor means then applies one of the standard techniques for decoding convolutional codes, one of the standard procedures for estimating the sequence of shift register states. However, it operates relative to a specific equivalent model encoder structure. Three standard techniques for decoding convolutional encoder outputs in the presence of noise are the Sequential Decoding-Fano Algorithm, the Sequential Decoding-Jelinek Algorith, and Viterbi Decoding. All of these are applicable here. Thus in this case one could use one of the family of Convolutional encoder-Viterbi decoders LV 7015, 7017A or 7026 manufactured by Linkabit Corporation, San Diego, Calif. 92121.

When the processor means PRM operates using any of these techniques set up to decode a convolutional code as described above in the case of unsynchronized communicators then maximum likelihood decisions concerning the identity of the data bits from all communicators can be obtained from the process means PRM. That is, the processor means provides those demodulator decisions $$\ldots \hat{X}_i(1), \ldots \hat{X}_i(k) \ldots \hat{X}_i(N) \ldots$$

which minimize probability of error. These X values are either +1 and −1. The processor means can readily identify the estimates $\hat{X}_i(k)$ which are intended for user USK. It can do this since it has a copy of the Convolutional Encoder. It supplies the data bits of interest via line POK to user USK.

Figure 7:
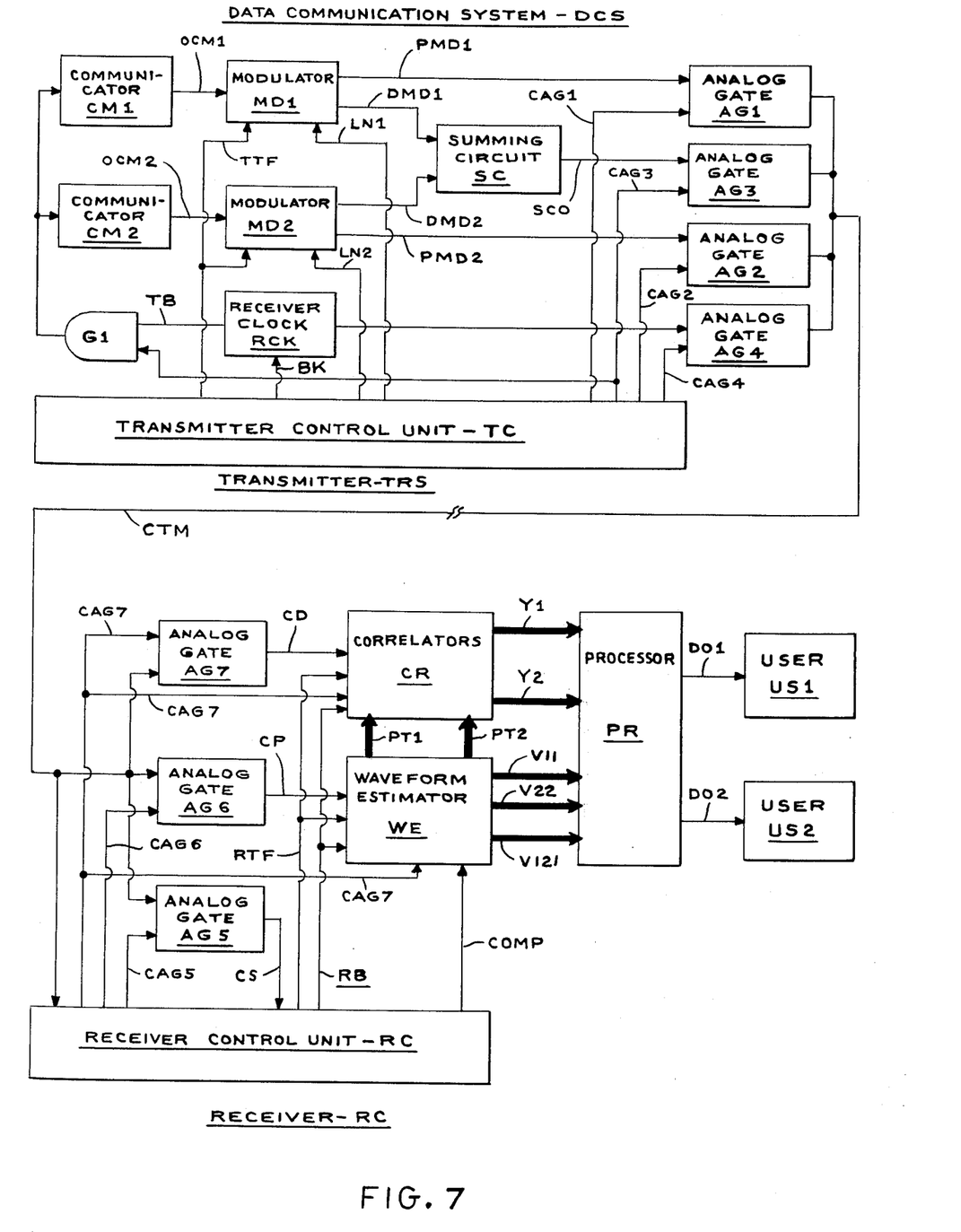
FIG. 7 is a block diagram of a specific embodiment of the data communications system according to the invention.

While the systems may service any number of communicators simultaneously, FIG. 7 shows the data communication system DCS for servicing two communicators CM1 and CM2 which transmit binary data to two users US1 and US2. The system includes a transmitter TRS which comprises primarily the modulators MD1 and MD2, and a plurality of logic gating circuits under the control of transmitter control unit TC. This system further includes a receiver REC including primarily the correlators CR, the waveform estimator WE, the processor PR and a plurality of analog gates under the control of receiver control unit RC. In general the data from the communicators in the form of binary signals or pulses of positive and negative polarity, respectively, are converted to cosinusoidal signals which are fed over the common transmission medium CTM.

Figure 9:
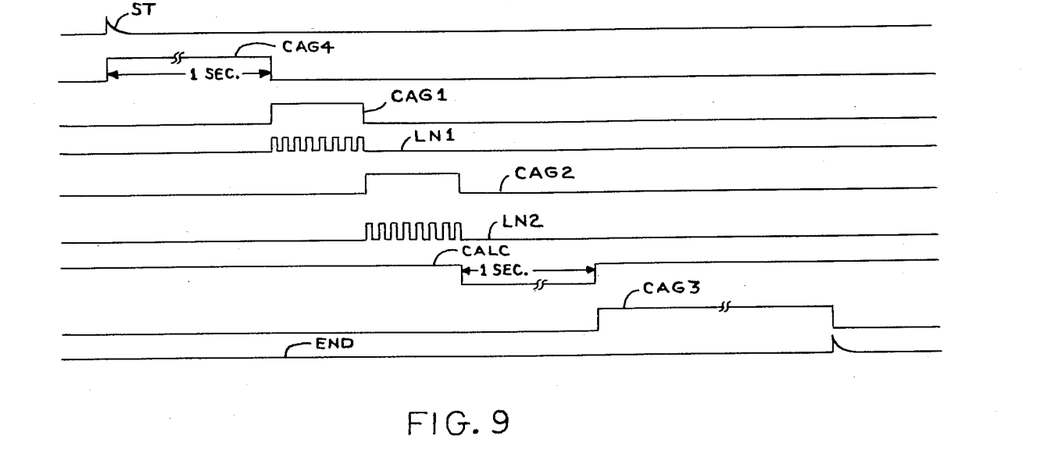
FIG. 9 is a waveform diagram useful in explaining the operation of the system of FIG. 7.

At the start of an operation the transmitter control unit TC starts emitting a stream of high frequency clock pulses on line TTF to both of the modulators MD1 and MD2. As an example, these clock pulses can be at the rate of 128 kHz. At the same time a signal on line CAG4 is transmitted to the control input of analog gate AG4 connecting the output of receiver clock RCK via said gate to the common transmission medium CTM. Receiver clock RCK which includes a pulse former and a cosinusoidal oscillator receives clock pulses on line BK from the transmitter control unit TC. These clock pulses occur at a one kHz rate. In response to each received clock pulse the receiver clock RCK emits a pulse onto line TB and at the same time excites the oscillator therein which can be of the phase loop lock type. Accordingly, this oscillator transmits a one kHz cosinusoidal waveform. This waveform is transmitted via the common transmission medium CTM to the receiver REC to bring the receiver REC into synchronism with the transmitter TRS. The waveform will be transmitted for one second. At the end of that one second the signal disappears on line CAG4 blocking the analog gate AG4. At the end of the signal on line GAG4, transmitter control unit TC transmits a signal on line CAG1 (see FIG. 9). The signal on line CAG1 will last for the occurrence of eight of the one kHz clock pulses. Coincident with each of the clock pulses the control unit TC will emit a pulse on line LN1 to modulator MD1. Modulator MD1 will interpret this pulse as equivalent to, say, a binary +1 data bit value and in response thereto emit a modulated signal waveform for a single binary +1 data bit value. In this manner eight of the modulated waveforms are transmitted via the line PMD1 and analog gate AG1 to the common transmission medium CTM. As will hereinafter become apparent these eight modulated signals are processed in the receiver REC for use by a particular correlator to demodulate information received from the common transmission medium. Note that each one of these waveforms is equivalent to the above mentioned signal waveform $S_k(t)$. Then transmitter control unit TC emits a pulse on line CAG2 which lasts for 8 of the one kHz clock pulses opening analog gate AG2 for a period of time during which eight copies of the modulation signal of modulator MD2 are fed to the receiver. At the occurrence of each of the clock pulses transmitter control unit TC emits a pulse on line LN2 which is received by the modulator MD2. This pulse modulates the signal waveform therein to emit a copy thereof onto the line PMD2. After eight such copies have been emitted the signal on line CAG2 terminates as do the pulses on line LN2. In this manner copies of the respective modulation waveforms are fed to the receiver for processing and storage therein prior to their utilization in the demodulation operation. While many waveforms can be used it is convenient to use cosinusoidal waveforms. The restrictions on these waveforms is that the frequency of the different waveforms are not multiples of each other. For the present example one can use a frequency of 1900 Hz for the waveform utilized by modulator MD1 and a frequency of 2100 Hz for the waveform used by the modulator MD2. Using these frequencies and realizing that each transmission period lasts one millisecond, it should be apparent that only a portion of a single cycle of each waveform is emitted per sample. As will hereinafter become apparent the data bits fed from the communicators are fed at the rate of one per millisecond, therefore, it should be further apparent that the actual modulated waveforms sent out are fractions of a cycle of the cosinusoidal waveform.

In any event at the termination of the signal on line CAG2 the transmitter control unit TC in effect blocks all of the analog gates AG1 to AG4 for a period of one second to permit the receiver REC to process the representative modulated signals for later use as will hereinafter become apparent. At the end of this one second interval the transmitter control unit TC raises the level on line CAG3 opening analog gate AG3 as well as the AND-circuit G1 and the actual data transmission phase begins. The signal on line CAG3 will remain high until the end of the transmission. If the transmission will take place in normal blocks then the signal will be present for a fixed time before another block is transmitted in the same manner. It is convenient to send the data in fixed blocks of given time duration so that the synchronization produced by the transmitter TRS remains in effect before the circuits in the receiver start drifting.

In any event the receiver clock RCK have been emitting one kHz pulses onto the line TB. Now that the AND-circuit G1 is opened, these pulses strobe the communicators CM1 and CM2 simultaneously. In response thereto each one of these communicators emits a signal representing either a binary +1 or a binary −1 on the respective lines OCM1 and OCM2. These signals are modulated by the respective modulators MD1 and MD2 and the modulated signal waveforms are fed via the lines PMD1 and PMD2 simultaneously to the summing circuit SC which feeds the signals on the line SCO via the analog gate AG3 onto the common transmission medium CTM. It should be noted that the signals on lines OCM1 and OCM2 are equivalent to the data bit values $X_i(k)$ of the system of FIG. 1. It should also be noted that the signals on lines PMD1 and PMD2 are equivalent to the signals $$X_i(k) \cdot S_k(t - \tau_k - (i-1))$$

Details of the transmitter TRS will now be described.

A typical communicator CM1 can be a device which, in response to a pulse, will emit data in the form of a signal having one polarity to represent a first binary value and an opposite polarity to represent the second binary value. In communication systems it is common to use the polarities +1 and −1 for such signals.

A typical analog gate AG1 can be a conventional AND-gate having control input which controls the passage of signals present at a second input to an output. The AND-circuit G1 could also be an analog gate. The clock has been described above. The summing circuit SC can be a conventional analog circuit which merely forms the analog sums of the signals present simultaneously its inputs into a composite signal which is fed from the output.

Figure 8:
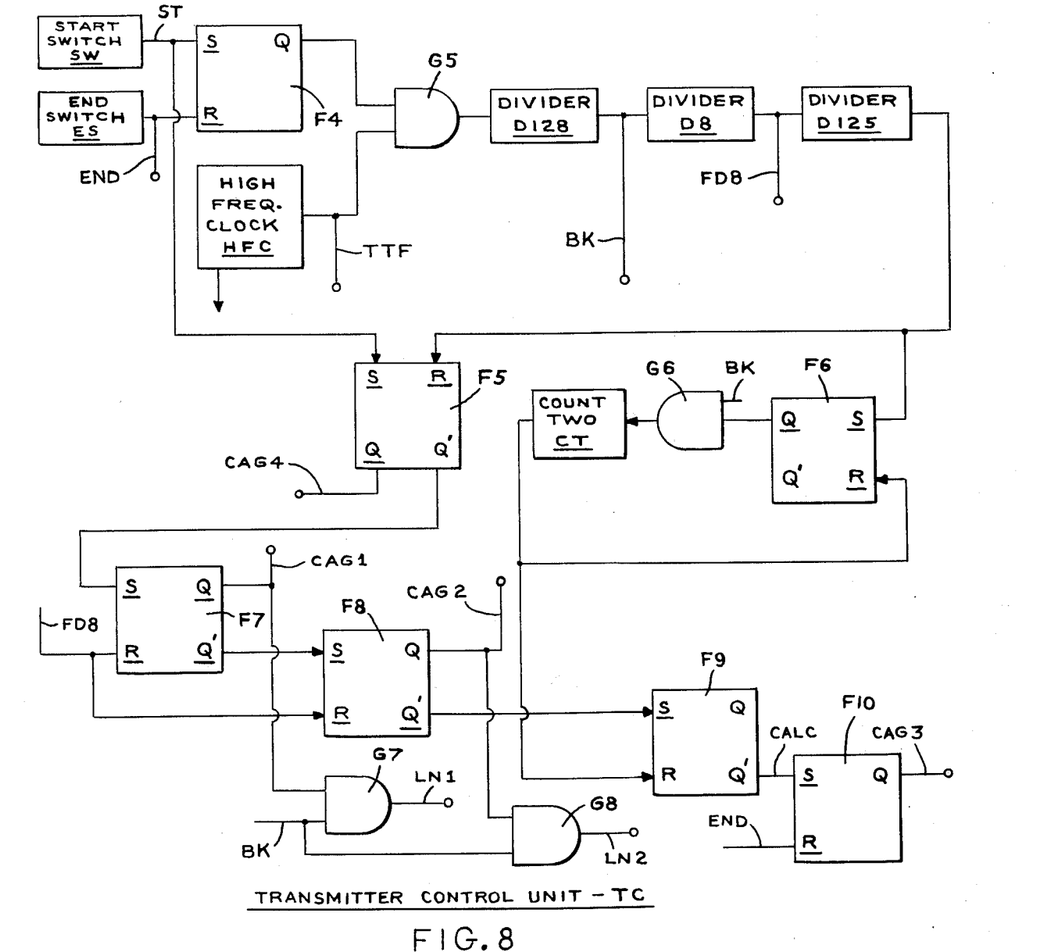
FIG. 8 is a block diagram of the transmitter control unit of FIG. 7.

The transmitter control unit TC is shown in detail in FIG. 8. In particular, the control unit TC is activated by the occurrence of a signal on line ST from the start switch SW. This signal sets the flipflop F4 which opens AND-circuit G5. At the same time the signal on line ST sets the flipflop F5 causing the production of a signal on line CAG4. While this is occurring the high frequency clock HFC which is a free-running pulse generator is emitting pulses on line TTF having the frequency of say 128 kHz. These signals also pass through the AND-circuit G5 to conventional divider D128 which divides these pulses by a factor of 128 to give the one kHz pulses on line BK. The one kHz pulses on line BK are further divided by divider D8 to give the pulses on line FD8. It should be noted that one FD pulse occurs for eight of the pulse on line BK. The pulses on line D8 are further divided by divider D125 and are fed therefrom to the reset input of flipflop F5. An analysis will show that from the time of occurrence of the pulse on line ST to the first pulse from divider D125 there had elapsed a second. Thus, the one second timing for the signal line CAG4 is established. When the flipflop F5 was reset its output Q' when positive setting the flipflop F7. The flipflop F7 will thereafter be reset by a pulse on line D8. This pulse will occur after the occurrence of eight of the pulses on line BK. Therefore the signal on line CAG1 controlling the analog gate A1 lasts eight pulse times. Simultaneously the signal on line CAG1 alerts AND-circuit G7 to pass the pulses on line BK to the line LN1. In this manner the eight pulses are fed via line LN1 to the modulator D1 for transmitting the eight copies of the modulated signals. When the flipflop F7 is reset it triggers on the flipflop F8 which starts generating the signal CAG2. The flipflop F8 is reset after eight pulses on line BK indicating by the signal on line FD8. Simultaneously, the signal on line CAG2 alerts AND-circuit G8 to permit passage of the BK pulses on line LN2 for causing the modulator MD2 to emit the eight copies of its modulation waveform signal. Setting of the flipflop F8 causes the setting of the flipflop F9 which will stay set for exactly one second during which time it generates the signal CALC from its output Q'. At the end of one second as established by the divider network and the flipflop F6 cooperating with the count two counter CT resets the flip-flop F9. The trailing edge of the signal line CALC sets the flipflop F10 to give the signal on line CAG3 which lasts until transmission ends in response to a signal from the end switch ES transmitting a signal on the line END to the reset terminal of flipflop F10.

Figure 10:
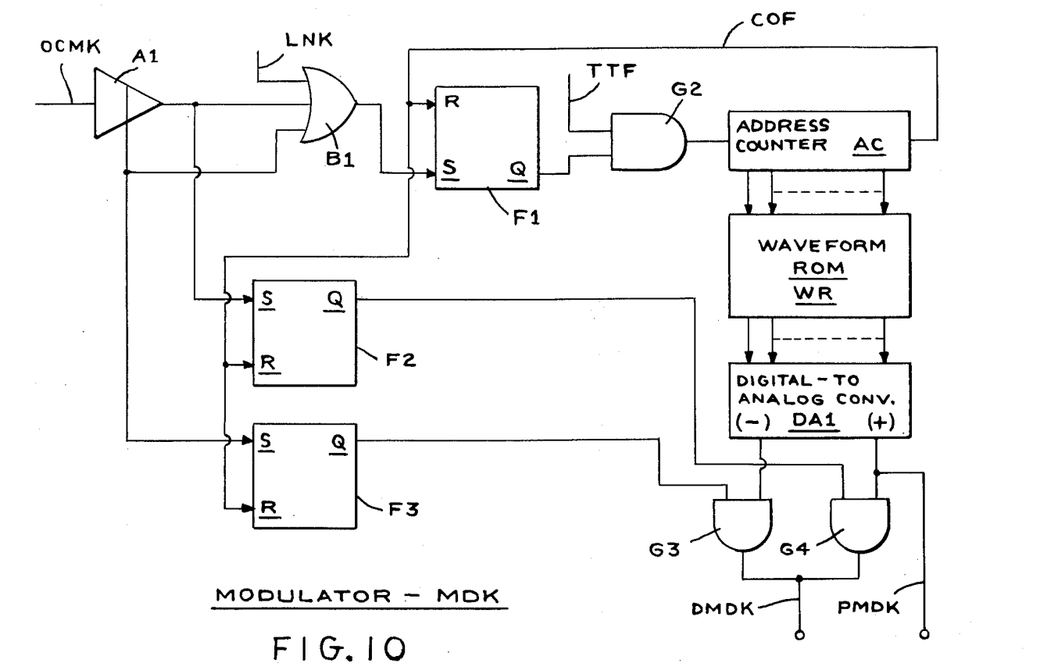
FIG. 10 is a block diagram of a typical modulator of the system of FIG. 7.

A typical modulator of MDK shown in FIG. 10 will now be described. In order to insure perfect reproducibility of the modulator waveform each time it is required, the modulator MDK includes a waveform read-only memory WR having 128 addressed memory locations. In each memory location is a binary number representing a particular instantaneous amplitude of the waveform. Thus when the memory locations are serially read there is emitted therefrom a series of binary numbers representing the sequential instantaneous amplitudes of the waveform. Accordingly, if each time the waveform is desired the memory locations are sequentially read in the same order starting from the same memory location, then the waveform is reproducible. Accordingly, there is provided an address counter AC which effectively counts the high frequency clock pulses TTF. Each time the flipflop F1 is set it opens AND-circuit G2 permitting a stream of high frequency clock pulses to sequentially increment the counter. When the counter reaches the count of 128 it emits pulse on line COF then the counter to reset the flipflop shutting down the counter say at the zero count. The flipflop will be set by a pulse at the output of OR-circuit B1. This circuit will pass a pulse whenever it receives a pulse during a pulse on line LNK. (It will be recalled that there will be eight such pulses at the start of transmission.) OR-circuit B1 will also emit a pulse in response to pulses from either the positive or negative output of the amplifier A1. The input of amplifier A1 is from the communicator connected thereto. Whenever the communicator transmits a +1 bit then the positive output of the amplifier will trigger flipflop F1 similarly if the the communicator emits a −1 bit, the negative output of the amplifier will also trigger the flipflop. Each time the flipflop is triggered the memory is read through its 128 positions and in response to each address call emits a binary word representing an amplitude to the digital-to-analog converter DA1. This converter in response thereto emits an analog signal at its positive output (+) and the inverted version of that same signal from its negative output (−). During the copy transmission phase the positive output of the analog-to-digital converter DA1 is fed onto line PMDK as described above. During the transmission of data one of the AND-circuits G3 or G4 will be operative to emit an analog signal on line DMDK. If the binary bit is a +1 then the flipflop F2 will be fed for the whole bit time, opening AND-circuit G4. On the other hand, if the bit is a −1 the flipflop F3 will be fed for the bit time and the AND-circuit G3 will be opened. In this way, the data bits modulate the modulation signals to either a positive or a negative polarity.

The operation of the receiver REC as shown in FIG. 7 will now be described. Initially the receiver REC is quiescent and monitoring the line CTM. Upon detection of signal on the line CTM the receiver control unit RC emits a signal on line CAG5 which opens analog gate AG5 connecting line CTM to line CS. It will be recalled that during the first second of transmitter operation there was sent a cosinusoidal waveform signal for synchronization purposes. This cosinusoidal waveform signal is received by control unit RC to synchronize a phase locked oscillator therein to generate the receiver clock pulses on line RB. These pulses will occur at a 1 kilo Hertz rate. Simultaneously within the receiver control unit RC there will be generated high frequency clock pulses which have a rate 128 times that of the pulses on line RB. Exactly one second after the synchronization started the signal on line CAG5 disappears and a signal on line CAG6 commences. This signal opens analog gate AG6 connecting the line CTM to the waveform estimator WE. It will be recalled that there will now be present on the line eight copies of the modulation signal waveform of the modulator MD1. These eight signal waveforms are fed to the waveform estimator WE wherein they are processed to come up with an average value of the waveform from these eight copies. Thereafter, in a similar manner, the eight copies of the modulation signal waveform from the modulator MD2 are processed by the waveform estimator WE to store an average value of that waveform. It will be noted that these average values are similar to the average values shown in the receiver of FIG. 5 as waveforms $S_k^*(t)$ after the occurrence sixteen of the clock pulses on line RB.

The signal on line CAG6 terminates, and a signal on line COMP energizes the waveform estimator WE to perform a series of calculations which will hereinafter be more fully described. These calculations will be used to generate signals on lines V11 to V121 for the processor PR. It will be recalled that on the transmitter side there is a hiatus of exactly one second to permit such calculations. At the end of this one second interval the signal on line COMP terminates and a signal occurs on line CAG7.

This signal opens analog gate AG7 connecting the line CTM to the inputs of the correlators CR. At this time the actual processing of data begins. Once per RB pulse time the correlators RC are energized to perform their demodulation operation. Each of the respective correlators receives on the associated cables PT1 and PT2 digital representations of the average modulation waveform signals. In response thereto, the correlators emit on cables Y1 and Y2 digital representations of the demodulated signals for the users US1 and US2 respectively. These digital representations are processed once per RB pulse time with digital representations of weights on the lines V11 to V21 to produce the respective bits for the user US1 and US2 on the lines DO1 and DO2, respectively.

It should be noted that the analog signals on the line CD to the correlators CR internal thereto are converted to digital representations of the signals so that all further processing occurs digitally as in hereinafter more fully described. It should also be noted that the digital representations on the cables Y1 and Y2 represent the signals of system of FIG. 1 indicated as Y*(k) and that the signals on lines DO1 and DO2 are the same as the signals X(k) of FIG. 1.

The various elements of the receiver REC will now be described in detail. The analog gates AG5 to AG7 are similar to those analog gates AG1 to AG4 heretofore described. The users US1 and US2 can be individual users each receiving a data stream or can be two receivers of data streams which are then interleaved into a signal data stream. In such case it would be the inverse of the communicators of FIG. 3.

Figure 11:
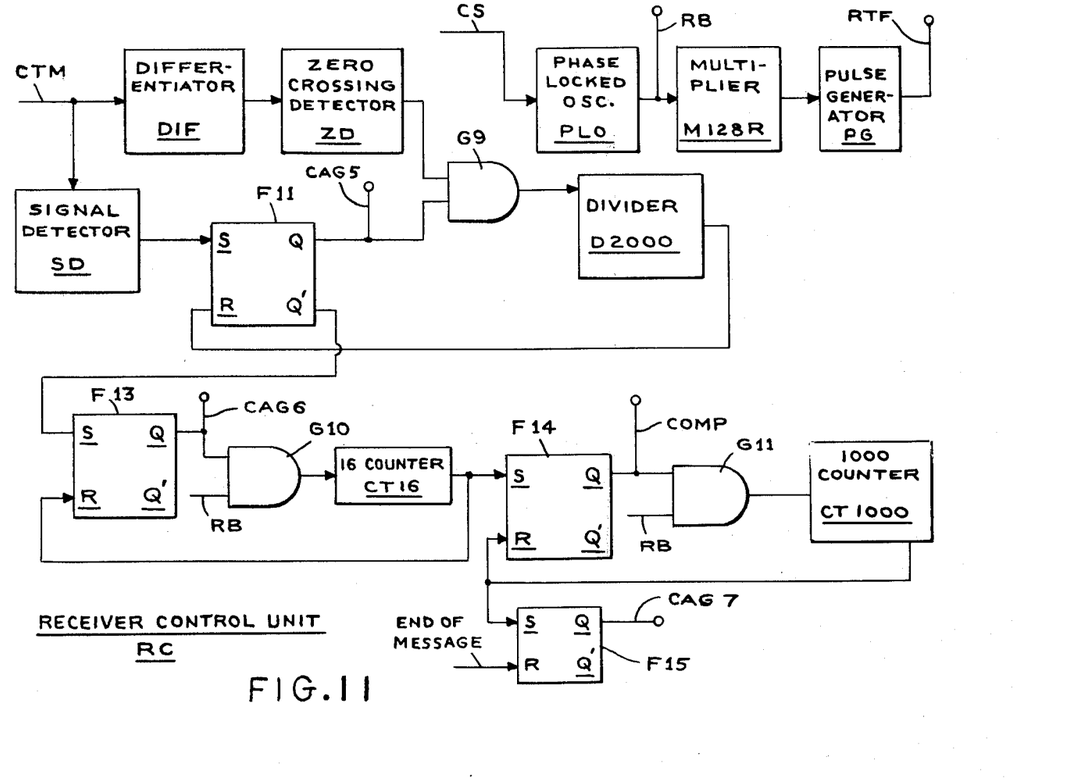
FIG. 11 is a block diagram of the receiver control unit of the system of FIG. 7.

The receiver control unit RC as shown in FIG. 11 sequences the receiver REC through its various steps of operation. Initially the sign detector SD monitors the line CTM and when it detects signals it sets the flipflop F11. Note the sign detector SD can be an appropriately biased diode. The setting of the flipflop F11 opens up AND-circuit G9. The signal on line CTM is differentiated by differentiator DIF to change it from a cosinusoidal to a sinusoidal waveform and in effect delay the signal by a quarter of a cycle. The sinusoidal waveform signal from the differentiator DIF is zero-crossing detected by the zero-crossing detector ZD and each zero crossing causes the emission of a pulse which passes through the AND-circuit G9 to the divider D2000. When 2,000 zero crossings have been detected the divider D2000 emits a pulse which reset the flipflop F11 terminating the signal on line CAG5. In this way the initial one second synchronizing period is established in the receiver. The resetting of the flipflop F11 causes the setting of the flipflop F13 and the initiation of the signal on line CAG6. Initiation of the signal on line CAG6 which controlled the averaging periods for the waveform estimator WE of FIG. 7 begins by opening the analog gate AG6. At the same time the signal on line CAG6 alerts AND-circuit G10 which now passes the bit clock pulses on line RB to the sixteen counter CT16. At the end of the count of sixteen of these pulses the counter emits a pulse which sets the flip-flop F14 and resets the flipflop F13 ending the averaging period and starting the computation period by the generation of a signal COMP which is fed to the waveform estimator WE to generate the binary representations on the lines V11 to V121. To presence of the signal on line COMP opens the AND-circuit G11 permitting the bit pulses on line RB to enter the one thousand bit counter CT1000. When this counter has counted 1000 of the bit pulses it emits a pulse which now resets the flipflop F14 and sets the flipflop F15. This will occur exactly in one second of time, the time required to perform the computation cycles. With the setting of the flipflop F15 a signal is generated on line CAG7 which opens up the analog gate AG7 initiating the determination of the actual data bits. The signal on line CAG7 is present until the end of the block of data wherein a device (not shown) will sense the end of a message or a timer will time out to end the block.

Figure 12:
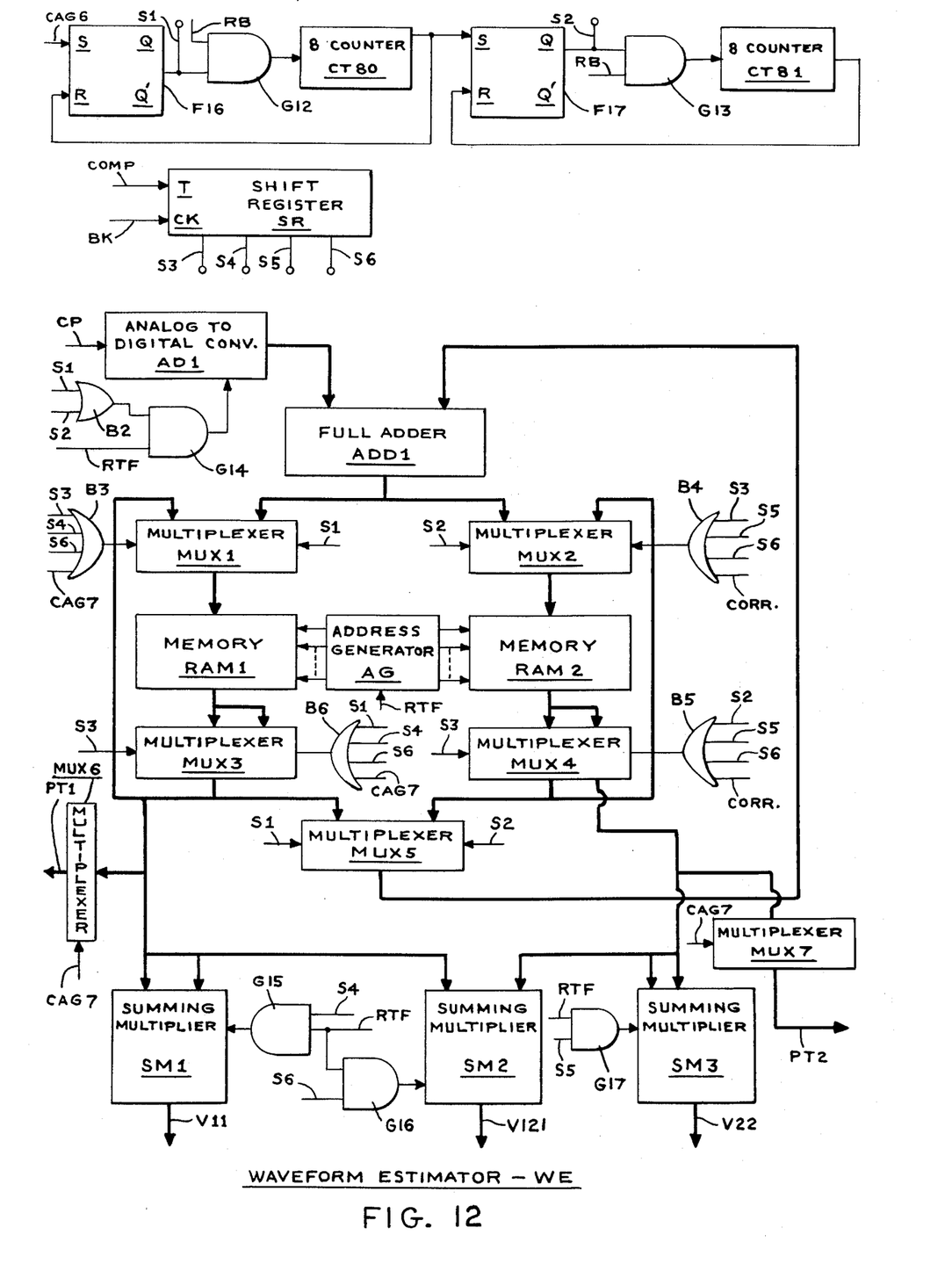
FIG. 12 is a block diagram of the waveform estimator of the system of FIG. 7.

The waveform estimator WE shown in FIG. 12 centers around the memories RAM1 and RAM2 wherein binary words representing analog amplitudes are stored and processed under the control of a state counter. The state counter is energized by the signal on line CAG6 which sets the flipflop F16 putting the estimator in its first state. In the first state the average waveform from the modulator MD1 will be calculated. The signal on line S1 opens the AND-circuit G12 permitting the passage of bit pulses to the eight counter CT80. After eight of these pulses have been counted, the counter CT80 emits a pulse which resets the flipflop F16 ending state 1 and sets the flipflop F17 commencing state 2 as represented by the signal on line S2. During this second state the average waveform for the modulator MD2 will be calculated. The signal on line S2 opens the AND-circuit G13 permitting the bit pulses on line RB to enter counter CT81. After eight such pulses have been counted the counter emlts a pulse which resets the flipflop F17 ending state 2. The waveform estimator WE then waits for the receipt of a pulse on line COMP from the receiver control RC to start the compute cycle wherein the binary values representing weighting functions are generated. Thereafter the states are generated by the shift register SR. The signal on line COMP initiates state S3 indicated by a signal on line S3. During this time the averaging process is completed for both of the waveforms. The occurrence of the next bit pulse on BK steps the shift register to emit a signal on line S4 initiating the fourth state in the calculation. During the fourth state the number representing the weight emitted on line V11 is calculated. During the next state a signal on line S5 permits the calculation for the weight number presented on line V121. The next occcurring bit pulse on line BK starts the state S6 wherein the weight presented on the cable V22 is generated.

The arithmetic part of the waveform estimator centers around the memories RAM1 and RAM2. Each of these memories is 128 words long and is addressed by the common address generator AG6 which is stepped by the high frequency clock pulses on the line RTF. It should be noted that the data path shown in heavy lines are actually multiwire cables so that the binary numbers can be serially fed bits in parallel among the various units. During state 1 when the eight copies of the modulation signal are received these copies are added to form a sum of the copies. In particular, the path is set up from the line CP to the analog digital converter AD1 which converts by periodic samplings at the rate of the pulses RTF. The analog signal from the analog gate AG6 is converted to binary numbers which are fed via one input of the full adder AD11 and the multiplexer MUX1 to the memory RAM1. During the first run through the memory the second or right input of the adder receives no signals. Therefore, there is loaded into the memory positions the original copy of the waveform. During the second BK cycle when the second copy of the waveform is received the memory RAM1 is again cycled through. It should be realized that these memories cyclically perform a read followed by a write operation. Accordingly, during the second cycle as the memory is read its contents pass via the right input of multiplexer MUX3 to the left input of multiplexer MUX5 and from there to the right input of full adder ADD1 while the second copy of the waveform is entering from analog to digital converter AD1. Thus, during the second copy of the waveform an addition is performed between the first copy and the second copy. Similarly, during the third copy of the waveform the sums of the first and second copy are added to the third copy of the waveform now entering. This occurs for the eight copies whose sum is then stored in the memory RAM1. A similar phenomenon occurs during state S2. In that state the memory RAM2 is accessed for the same types of writing and an analysis of the control signals on lines S2 will show recirculation paths from the memory RAM2 to the adder ADD1. At the end of the second state there will be stored in the memory RAM1 a binary representation of 128 sample points of the modulation signal from modulator MD1 and in memory RAM2 a similar 128 binary values of 128 corresponding points of the modulation waveform from amplifier MB2.

During state S3 each of the memories is cycled through once, that is, the contents of each cell of each memory is read and then rewritten. However, the recycling takes place via the left inputs of the multiplexers MUX3 and MUX4 respectively under the control of the signals on lines S3. If the multiplexers are set up such that the left inputs of the multiplexers are directly connected to the outputs and the right inputs of the multiplexers are connected with a three bit position right shift, then it is seen that this kind of recycling in effect divides the stored sums by the value 8. In this manner the average binary representations of the waveforms are obtained.

During state 4 when a signal is present on line S4 memory RAM1 is cycled through one sequential reading of all its cells. During that reading the summing multiplexer SM1 is energized by the signal present on line SM which permits the high frequency clock pulses on line RTF to pass through AND-circuit G15 to operate the multiplier periodically. It will be noted that both inputs of the multiplier receive the same binary numbers from the memory RAM1. In effect then what is stored in the summing multiplier FM1 is the sum of the square of all the values of the waveform or a close approximation of the selfcorrelation value $R_{11}$. During state 6 in presence of a signal on line S5 the memory RAM2 is sequentially cycled. At this time the outputs of the memory are fed to both inputs of the summing multiplier SM3 which under the control of AND-circuit G17 performs the squaring and adding operation as described for the multiplier SM1. At the end of this cycle there is stored a close approximation of the self correlation value $R_{22}$. Finally, during the state 6 in the presence of a signal on line S6 both memories are cycled through and the summing multiplier SM2 is energized to form the cross correlation between the two waveforms. Because of the symmetry the correlation value $R_{12}$ and $R_{21}$ are approximately the same so it is only necessary to do one of the operations. Thus, at the end of state 6 there is stored in summing multiplier SM1 a correlation value $R_{11}$ in summing multiplier SM2 a correlation value $R_{12}$ = correlation value $R_{21}$ and in summing multiplier SM3 a correlation value $R_{22}$. These values will be used by the processor PR as hereinafter described.

At the end of the compute mode a signal is fed onto line CAG7 which now starts the demodulation mode. The signal on CAG7 alerts the multiplexers MUX6 and MUX7 to connect the outputs of the memories RAM1 and RAM2 to the cables PT1 and PT2, respectively connected to their associated correlators.

Figure 13:
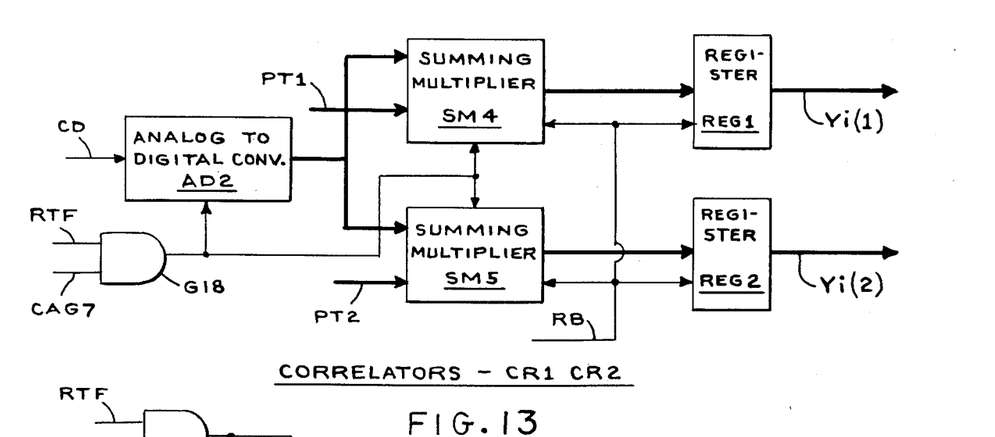
FIG. 13 is a block diagram of the correlators of the system of FIG. 7.

These correlators are shown in FIG. 13 and comprise the summing multipliers SM4 and SM5 respectively. First inputs of the multipliers SM4 and SM5 receive the binary representation on the cables PT1 and PT2, respectively. The second inputs of the multipliers are connected to the output of the analog-to-digital converter AD2 which periodically samples the modulated signals entering the correlators on the line CD. At the end of each bit time the accumulated sums in the multipliers are transferred to their respective storage registers REG1 and REG2 which act as sample and hold circuits. The outputs of these registers are binary numbers on the cables $Y_i1$ and $Y_i2$ which now require processing by the processor PRM.

In order to obtain the best approximation of the bits the post processor must perform the computations $$\hat{X}_i(1) = V_{11} \cdot Y_i(1) + V_{12} \cdot Y(2)$$
$$X(2) = V_{21} \cdot Y(1) + V_{22} \cdot Y(2) \text{ where}$$
$$V_{11} = \frac{R_{22}}{C}; V_{22} = \frac{R_{11}}{C}; V_{12} = \frac{-R_{21}}{C}; V_{21} = \frac{-R_{12}}{C}$$
and $C = 1 - R_{12} R_{21}$.

However, since the processor will only require the sign of the results in accordance with the invention the computations are simplified so that $$V_{11} = R_{22}; V_{22} = R_{11}; V_{12} = V_{21} = -R_{12} \text{ or } -R_{21}$$

Hereinafter the value $V_{12}$ will be designated $V_{121}$ to show its dual role. Note these are the numbers generated by waveform estimator WE.

Figure 14:
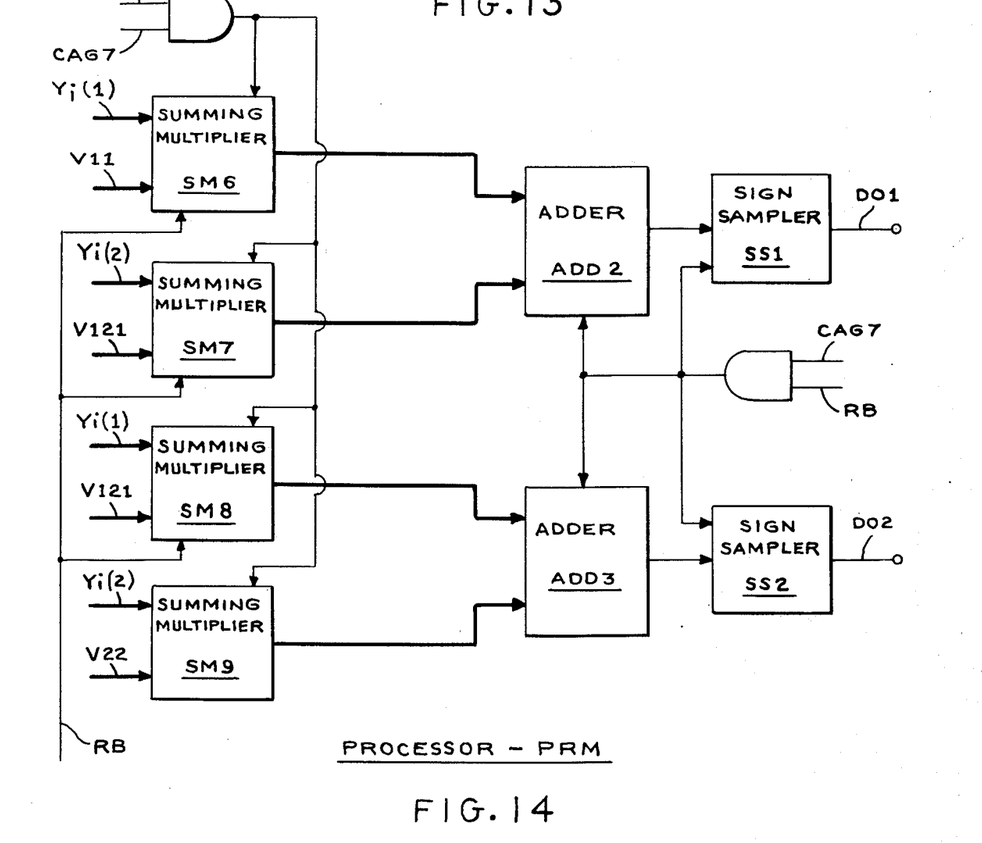
FIG. 14 is a block diagram of the processor of the system of FIG. 7.

In accordance with the above cited equations the processor PRM shown in FIG. 14 comprises the summing multipliers SM6 to SM9. The outputs of the pairs of summing multipliers are fed to inputs of full adders AD2 and AD3, respectively, which at the end of each bit time are cleared and sampled by sign samplers SM1 and SM2 respectively. The sign samplers merely look at the sign position of the adders to give the values of the sign indicating the binary value of the bit then being sampled. These bit values are fed to the respective users on the lines DO1 and DO2 respectively.

The summing multipliers can be of the type TDC 10104 manufactured by TRW, Inc.

While only a limited number of embodiments have been shown and described in detail there will now be obvious to those skilled in the art many modifications and variations satisfying many or all of the objects of the invention but which do not depart from the spirit thereof as defined by the appended claims.

What is claimed is:

1. A data communication system for transmitting binary information wherein each information bit is represented by a signal of a first value or a signal of a second value, said system comprising: a transmitter means, said transmitter means comprising at least first and second communicator means, each of said communicator means including means for emitting a series of information bits represented by said signals, at least first and second modulator means, said first and second modulator means generating first and second modulation signals sets, respectively, said modulation signal sets being linearly independent, said first communicator means being connected to said first modulator means whereby said first modulator means emits a first modulated signal, said second communicator means being connected to said second modulator means whereby said second modulator means emits a second modulated signal; a common transmitter means for transferring said modulated signals from said transmission means to a point remote therefrom; a receiver means comprising first and second correlator means having inputs for receiving the modulated signals received from said common transmission means, said first correlator means including means for correlating all received modulated signals with a signal uniquely related to said first modulation signal set and emitting first correlated signals, said second correlator means including means for correlating all received modulated signals with another signal uniquely related to said second modulation signal set and emitting second correlated signals, and processor means connected to said correlator means for interactively processing the first and second correlated signals and emitting first output signals having one of two binary values in accordance with the polarity of the first correlated signals emitted from said first correlator means and for emitting second output signals having one of said two binary values in accordance with the polarity of the second correlated signals emitted from said second correlator means.

2. The system of claim 1 wherein said transmitter means comprises a source of serially occurring information bits, means for de-interleaving the stream of the serially occurring information bits into first and second branches for emission by said first and second communicator means, respectively.

3. The system of claim 1 wherein: said first modulation signal set comprises as a first element of the set at least a portion of a first cosinusoidal waveform having a first frequency and as a second element of the set the inverse thereof; and said second modulation signal set comprises as a first element of the set at least a second cosinusoidal waveform having a second frequency linearly independent of said first frequency and as a second element of the set the inverse thereof.

4. The system of claim 1 further comprising at least first storage means for storing a first representation of at least one element of said first modulation signal set received via said common transmission means, and second storage means for storing a second representation of at least one element of said second modulation signal set received via said common transmission means, said stored representations for use by said correlator means.

5. The system of claim 4 wherein: said first correlator means comprises means for multiplying the received modulated signals by said first representation and integrating the product signal for a given period of time to produce a first correlated signal; and said second correlator means comprises means for multiplying the received modulated signals by said second representation and integrating the product signal for said given period of time to produce a second correlated signal.

6. The system of claim 1 wherein said processor means comprises first detector means connected to said first correlator means for emitting a signal having one of two binary values in accordance with the polarity of the signal emitted by said first correlator means and second detector means connected to said second correlator means for emitting a signal having one of said two binary values in accordance with the polarity of the signal emitted by said second correlator means.

7. The system of claim 1 or 4 wherein said processor means comprises first summing means for forming at least a first sum signal of given algebraically weighted amplitudes of the signals from all of said correlator means and second summing means for forming at least a second sum signal of given algebraically weighted amplitudes of the signals from all of said correlator means.

8. The system of claim 7 wherein said given algebraic weights are derived from the representations stored in said storage means.

9. The system of claim 8 wherein said processor means further comprises first detector means connected to said first summing means for emitting a signal having one of two binary values in accordance with the polarity of the signal emitted by said first summing means, and second detector means connected to said second summing means for emitting a signal having one of said two binary values in accordance with the polarity of the signal emitted by said second summing means.

10. A data communication system for transmitting binary information wherein each information bit is represented by a signal of a first value or a signal of a second value, said system comprising: a transmitter means, said transmitter means comprising at least first and second communicator means, each of said communicator means including means for emitting a series of information bits, represented by said signals, at least first and second modulator means, said first and second modulator means generating first and second modulation signal sets, respectively, said modulation signals sets being linearly independent, said first communicator means being connected to said first modulator means whereby said first modulator means emits a first modulated signal, said second communicator means being connected to said second modulator means whereby said second modulator means emits a second modulated signal; a common transmission means for transferring said modulated signals from said transmission means to a point remote therefrom; a receiver means at said point, said receiver means comprising first and second correlator means having inputs for receiving the modulated signals received from said common transmission means, said first correlator means including means for correlating all received modulated signals with a signal uniquely related to said first modulation signal set and emitting first correlated signals, said second correlator means including means for correlating all received modulator signals with another signal uniquely related to said second modulation signal set and emitting second correlated signals, and processor means comprising means decoding convolutional codes connected to said correlator means for interactively processing the first and second correlated signals and emitting signals having one of two binary values in accordance with the signals received from said correlator means.

11. In a data communication system wherein a plurality of communicators at a transmitter emit bits of information to respective modulators, each operating with a modulation signal, which transmit bit-modulated signals to a plurality of users, each associated with a definite communicator at a receiver over a common transmission medium, the modulation signals being mutually linearly independent, the method of signal processing comprising the steps of first sequentially transmitting from said transmitter to said receiver a modulation signal from each modulator, at the receiver storing a representation of each received modulation signal, and utilizing each stored representation to detect bits for the respective users in a stream of modulated signals.

12. The method of claim 11 wherein the modulation signal from each modulator is transmitted a plurality of times and a representation of an average waveform of each of said signals is stored.

13. The method of claim 12 wherein each modulation signal is an analog signal of given duration and the representation of each average waveform is obtained at the receiver by the steps of periodically sampling the analog signal a plurality of times during each given duration, converting the analog amplitude of the received modulation signal at a sampling time to a digital value representing the amplitude, averaging each such digital value over the plurality of times the modulation signal is received, and storing such digital values for sequential recall.

14. The method of claim 12 wherein said utilizing step comprises correlating all received modulated signals with each of said average waveforms to produce a set of correlated signals each associated with a definite user.

15. The method of claim 13 wherein said modulated signals are analog signals of said given durations and said utilizing step comprises the steps of periodically sampling said modulated signals a plurality of times during each given duration, converting the sampled analog amplitude of the modulated signal to a digital value, in synchronism therewith, multiplying said digital values by the corresponding stored digital values and summing the products of such multiplications to produce digital representation of correlated signals.

16. The method of transmitting binary data from a plurality of N communicators at a transmitter to a plurality of N users at a receiver simultaneously over a common channel comprising the steps of: each communicator generating a signal once per period of time T and in the form $X_i(k)$, where i represents the $i^{th}$ bit in the stream occurring at a time $(i-1)T$, k represents a typical communicator and its associated user, $X_i(k)$ having only either a first or a second binary value; modulating a plurality of modulation signals in the form $S_k(t)$ with the $X_i(k)$ bits of the data streams to generate a plurality of modulated signals of the form $$X_i S_k(t-(i-1)T),$$

where $S_k(t)$ is the modulation signal for said typical communicator; transmitting over the common channel a signal in the form w(t), where w(t) represents the instantaneous sum of all of said modulated signals; generating a plurality of signals of the form $S_k^*(t)$, where $S_k^*(t)$ is a representation of the modulation signal $S_k(t)$ after transmission over the common channel; correlating for each period of time T the signal of the form w(t) with each of the representations of the modulation signals $S_k^*(t)$ to produce signals of the form $$Y_i^*(k) = \int_{(i-1)T+\Delta}^{iT+\Delta} w(t) S_k^*(t - \Delta - (i-1)T) dt,$$

where $\Delta$ is the time for signals to travel over the common channel; and interactively processing each of said $Y_i^*(k)$ signals to produce signals of the form $$X_i(k) = +1 \cdot \text{sign of} \left\{ \sum_{j=1}^{N} V_{kj} \cdot Y_1^* \right\} ; \text{ where}$$

$V_{kj}$ is a numerical coefficient derived from correlations of the signals of the form $S_k^*(t)$.

17. The method of claim 16 wherein said signals of of the form $S_k(t)$ are at least a portion of a cycle of a cosinusoidal waveform and said signals of the form $X_i(k)$ have values of $(+)A$ or $(-)A$, where A is a constant.

18. The method of claims 16 or 17 wherein the step of generating said signals in the form $S_k(t)$ comprises storing a plurality of binary member representations, sequentially reading the stored representations, and sequentially converting the read representations to analog signals.

19. The method of claim 16 wherein the step of generating signals of the form $S_k^*(t)$ comprises transmitting the signals $S_k(t)$ from the transmitter to the receiver and storing the received signals.

20. The method of claim 19 wherein each of said signals $S_k(t)$ is transmitted a plurality of times and an average of the plurality of transmitted signals is stored representing signals of the form $S_k^*(t)$.

21. The method of claim 20 wherein said signals of the form $S_k(t)$ are at least a portion of a cycle of a cosinusoidal waveform and said signals of the form $X_i(k)$ have values of $(+)A$ or $(-)A$, where A is a constant.

22. The method of claims 20 or 21 wherein at said receiver each of the received signals of the form $S_k(t)$ is converted to a series of binary numbers said binary numbers are stored, and thereafter said binary numbers are sequentially used to generate the signals of the form $S_k^*(t)$.

23. The method of claim 16 wherein at the receiver in each time interval T multiplying the signal of the form w(t) by each of the N signals of the form $S_k^*(t)$ in parallel, integrating each so formed product signal and at the end of each interval T temporarily storing each of the integrated signals which will then have the form $Y_i^*(k)$.

24. The method of claim 22 wherein said correlating step comprises during each time interval T the signals of the form w(t) are converted to an input a series of binary numbers, sequentially multiplying the input series of binary numbers with each of the stored series of binary numbers in parallel while accumulating the generated products in parallel, and at the end of each time interval T temporarily storing N binary numbers, each representing one of the signals of the form $Y_i^*(k)$.

25. The method of claim 16 wherein said processing step comprises generating signals of the form $$R_{jm} = \int_{-\infty}^{\infty} S_j^*(t) \cdot S_m^*(t) \, dt$$

by pairwise correlating the signals of the form $S_k^*(t)$, and generating therefrom by matrix algebra rules the signal of the form $V_{kj}$.

26. The method of claim 25 wherein at said receiver each of the received signals of the form $S_k(t)$ is converted to a series of binary numbers said binary numbers are stored, and thereafter said binary numbers are sequentially read to generate the signals of the form $S_k^*(t)$, said step for generating signals of the form $R_{jm}$ comprising sequentially multiplying the series of stored binary numbers representing the signals of the form $S_j^*(t)$ and $S_m^*(t)$ and summing the generated products to produce a set of binary number values.

* * * * *